United States Patent
Shah et al.

(10) Patent No.: US 8,324,838 B2
(45) Date of Patent: *Dec. 4, 2012

(54) ILLUMINATION DEVICE AND FIXTURE

(75) Inventors: Ashok Deepak Shah, Atlanta, GA (US); David Diehl Roberts, III, Birmingham, AL (US)

(73) Assignee: Cooper Technologies Company, Houston, TX (US)

( * ) Notice: Subject to any disclaimer, the term of this patent is extended or adjusted under 35 U.S.C. 154(b) by 796 days.

This patent is subject to a terminal disclaimer.

(21) Appl. No.: 12/408,463

(22) Filed: Mar. 20, 2009

(65) Prior Publication Data

US 2009/0237011 A1    Sep. 24, 2009

Related U.S. Application Data

(60) Provisional application No. 61/038,211, filed on Mar. 20, 2008.

(51) Int. Cl.
*H05B 37/02* (2006.01)
(52) U.S. Cl. ........................................ 315/307; 315/291
(58) Field of Classification Search ................. 315/291, 315/307, 308, 292, 224
See application file for complete search history.

(56) References Cited

U.S. PATENT DOCUMENTS

| | | | |
|---|---|---|---|
| 2,733,831 A | 2/1956 | Nehls | |
| 5,857,767 A | 1/1999 | Hochstein | |
| 5,884,205 A | 3/1999 | Elmore et al. | |
| 6,016,038 A * | 1/2000 | Mueller et al. | 315/291 |
| 6,234,645 B1 | 5/2001 | Borner et al. | |
| 6,441,558 B1 | 8/2002 | Muthu et al. | |
| 6,495,964 B1 | 12/2002 | Muthu et al. | |
| 6,507,158 B1 | 1/2003 | Wang | |
| 6,507,159 B2 | 1/2003 | Muthu | |
| 6,528,594 B1 | 3/2003 | Bauer et al. | |
| 6,552,495 B1 | 4/2003 | Chang | |
| 6,576,881 B2 | 6/2003 | Muthu et al. | |
| 6,596,977 B2 | 7/2003 | Muthu et al. | |
| 6,608,453 B2 * | 8/2003 | Morgan et al. | 315/312 |
| 6,614,204 B2 | 9/2003 | Pellegrino et al. | |
| 6,724,159 B2 | 4/2004 | Gutta et al. | |
| 6,741,351 B2 | 5/2004 | Marshall et al. | |
| 6,777,891 B2 | 8/2004 | Lys et al. | |
| 6,822,555 B2 * | 11/2004 | Mansfield et al. | 340/538.11 |

(Continued)

FOREIGN PATENT DOCUMENTS

CN        1464695 A        12/2003

OTHER PUBLICATIONS

U.S. Official Action dated Jun. 9, 2011 in U.S. Appl. No. 12/408,503.

(Continued)

*Primary Examiner* — Minh D A
(74) *Attorney, Agent, or Firm* — Hope Baldauff Hartman, LLC

(57) ABSTRACT

Technologies are described herein for an illumination device and a corresponding fixture device. The illumination device includes a luminary module for the emission of light and an identification circuit containing identifying data, while the fixture device includes a driver module for supplying power to the illumination device and a controller module. When the illumination device is connected to the fixture device, the controller module communicates with the identification circuit of the illumination device to retrieve the identifying data and causes the driver module to supply the appropriate power to the luminary module of the illumination device.

18 Claims, 5 Drawing Sheets

U.S. PATENT DOCUMENTS

| | | | |
|---|---|---|---|
| 6,831,569 B2 | 12/2004 | Wang et al. | |
| 6,897,624 B2 * | 5/2005 | Lys et al. | 315/297 |
| 6,933,685 B2 | 8/2005 | Gutta et al. | |
| 6,975,079 B2 | 12/2005 | Lys et al. | |
| 6,982,870 B2 * | 1/2006 | Wu et al. | 361/679.33 |
| 6,998,594 B2 | 2/2006 | Gaines et al. | |
| 7,014,336 B1 | 3/2006 | Ducharme et al. | |
| 7,140,752 B2 | 11/2006 | Ashdown | |
| 7,161,556 B2 | 1/2007 | Morgan et al. | |
| 7,178,941 B2 | 2/2007 | Roberge et al. | |
| 7,202,613 B2 | 4/2007 | Morgan et al. | |
| 7,231,060 B2 | 6/2007 | Dowling et al. | |
| 7,233,515 B2 | 6/2007 | Rohr | |
| 7,253,566 B2 | 8/2007 | Lys et al. | |
| 7,255,457 B2 | 8/2007 | Ducharme et al. | |
| 7,319,298 B2 | 1/2008 | Jungwirth et al. | |
| 7,344,279 B2 | 3/2008 | Mueller et al. | |
| 7,387,405 B2 | 6/2008 | Ducharme et al. | |
| 7,456,588 B2 | 11/2008 | Alexandrov | |
| 7,703,951 B2 | 4/2010 | Piepgras et al. | |
| 7,725,629 B2 * | 5/2010 | Sturm et al. | 710/72 |
| 7,766,518 B2 * | 8/2010 | Piepgras et al. | 362/373 |
| 7,961,090 B2 | 6/2011 | Hu | |
| 2004/0137935 A1 | 7/2004 | Zarom | |
| 2004/0178683 A1 | 9/2004 | Hermetz et al. | |
| 2004/0259435 A1 | 12/2004 | Stephan et al. | |
| 2005/0097162 A1 | 5/2005 | Budike, Jr. | |
| 2005/0289279 A1 | 12/2005 | Fails et al. | |
| 2006/0022214 A1 | 2/2006 | Morgan et al. | |
| 2006/0142900 A1 | 6/2006 | Rothman et al. | |
| 2006/0262544 A1 | 11/2006 | Piepgras et al. | |
| 2007/0024213 A1 | 2/2007 | Shteynberg et al. | |
| 2007/0145915 A1 | 6/2007 | Roberge et al. | |
| 2007/0213879 A1 | 9/2007 | Iwamura | |
| 2007/0228999 A1 | 10/2007 | Kit | |
| 2007/0260405 A1 | 11/2007 | McConnell et al. | |
| 2008/0052145 A1 | 2/2008 | Kaplan et al. | |
| 2009/0062967 A1 | 3/2009 | Kressner et al. | |
| 2009/0086487 A1 | 4/2009 | Ruud et al. | |
| 2009/0238252 A1 | 9/2009 | Shah et al. | |
| 2009/0240380 A1 | 9/2009 | Shah et al. | |

OTHER PUBLICATIONS

The International Search Report and The Written Opinion of the International Searching Authority, or the Declaration dated May 27, 2009 of the co-pending PCT Application Serial No. PCT/US09/37843 filed Mar. 20, 2009.

U.S. Official Action dated Dec. 7, 2010 in U.S. Appl. No. 12/408,503.

International Search Report dated Apr. 29, 2009 in International Application No. PCT/US09/37859.

International Search Report dated May 22, 2009 in International Application No. PCT/US09/37866.

Renesas, "Renesas Board ID™" Renesas Technology America, Inc., 2008, 2 pages.

Ramatchandirane et al., "Board ID—An Improved Approach to Achieving Robust Machine-to-Machine Authentication that Reduces Operating Risks and Enables Profitable Business Strategies," White Paper, Renesas Technology America, Inc., Jul. 8, 2008, 5 pages.

U.S. Notice of Allowance dated Oct. 31, 2011 in U.S. Appl. No. 12/408,503.

U.S. Official Action dated Apr. 24, 2012 in U.S. Appl. No. 12/408,499.

Chinese Official Action dated Mar. 20, 2012 in Chinese Application No. 200980119568.2.

* cited by examiner

ILLUMINATION DEVICE AND FIXTURE

CROSS-REFERENCE TO RELATED APPLICATION

This application claims the benefit of U.S. provisional patent application No. 61/038,211, filed on Mar. 20, 2008, entitled "Intelligent Illumination and Energy Management System," which is expressly incorporated herein by reference in its entirety.

TECHNICAL FIELD

The present invention relates generally to the field of electric lighting and, more particularly, to a lighting system comprising an illumination device and a corresponding fixture device.

BACKGROUND

Rising energy costs and growing environmental concerns has increased the need for energy management technologies and techniques. A major source of energy usage in industrial, commercial, and residential settings is electric lighting. Alternative lighting devices may be utilized along with associated illumination and energy management systems to provide more efficient lighting, lower energy usage, monitoring and load management, and other related benefits and features. Alternative lighting devices based on solid-state luminary devices or other low wattage illumination technology may provide lower overall costs and longer replacement cycles of up to 30,000 hours or more.

However, these types of alternative lighting devices may have a higher up-front cost than traditional lighting. Moreover, it may be desirable to control which lighting devices are allowed to be used in a particular illumination system, both for ensuring compatibility and quality of the devices used in the system, as well as for providing a licensing enforcement mechanism for manufactures producing compatible devices. The rapid pace of development in this area, coupled with the longer replacement cycles may also create a situation wherein, when replacement is necessary for one of these devices, the capabilities and specifications of compatible lighting devices may have changed from the original version. In addition, the high up-front cost coupled with the longer replacement cycles may create a secondary market for these types of lighting devices.

It is with respect to these and other considerations that the disclosure made herein is presented.

SUMMARY

It should be appreciated that this Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

According to embodiments, a lighting system including an illumination device and a corresponding fixture device is provided. The illumination device includes a luminary module for the emission of light and an identification circuit containing identifying data, while the fixture device includes a driver module for supplying power to the illumination device and a controller module. When the illumination device is connected to the fixture device, the controller module communicates with the identification circuit of the illumination device to retrieve the identifying data and causes the driver module to supply the appropriate power to the luminary module of the illumination device.

According to another embodiment, an illumination device is provided that includes an array of solid-state luminary ("SSL") devices and an identification circuit containing identifying data. When the illumination device is connected to a corresponding fixture device, the fixture device retrieves the identifying data from the identification circuit and supplies power to the SSL array.

In a further embodiment, a method of authenticating an illumination device connected to a corresponding fixture device is provided. The fixture device initializes an identification circuit in the illumination device and communicates with the identification circuit to retrieve identifying data regarding the illumination device. The fixture device determines whether the illumination device is authentic based on the identifying data. If the fixture device determines the illumination device is authentic, the fixture device supplies the appropriate power to a luminary module on the illumination device. However, if the fixture device determines that the illumination device is not authentic, the fixture device disables all power to the illumination device.

Other systems, apparatuses, and methods according to embodiments will be or become apparent to one with skill in the art upon review of the following drawings and Detailed Description. It is intended that all such additional systems, apparatuses, and/or methods be included within this description, be within the scope of the present invention, and be protected by the accompanying claims.

DETAILED DESCRIPTION

The following detailed description is directed to an illumination device and corresponding fixture device. Because of the higher cost of components in many alternative lighting devices, the separation of the expendable illumination components in the illumination device from the driving and control components in the fixture device may be beneficial to the manufacturing and implementation costs of these devices. Further, the fixture device is capable of authenticating attached illumination devices and may only supply power to authorized devices. In this way, an implementer of the fixture device is provided with a mechanism for enforcing specifications and quality standards as well as licensing agreements with manufacturers of compatible illumination devices.

In addition, the illumination device may be capable of supplying the fixture device with optimal driver parameters, such that when a new or replacement illumination device is attached to a compatible fixture device, the fixture device may adjust the supplied power accordingly to ensure the highest level of efficiency and/or longest life for the illumination device. The illumination device may also be capable of collecting and storing usage information, such as hours of operation, in such a way that is accessible to the fixture device. If the illumination device is moved to another fixture, or sold to another user in a secondary market, the historical usage information regarding the illumination device will be available to the new fixture device.

In the following detailed description, references are made to the accompanying drawings that form a part hereof, and that show, by way of illustration, specific embodiments or examples. In the accompanying drawings, like numerals represent like elements through the several figures.

Figure 1:
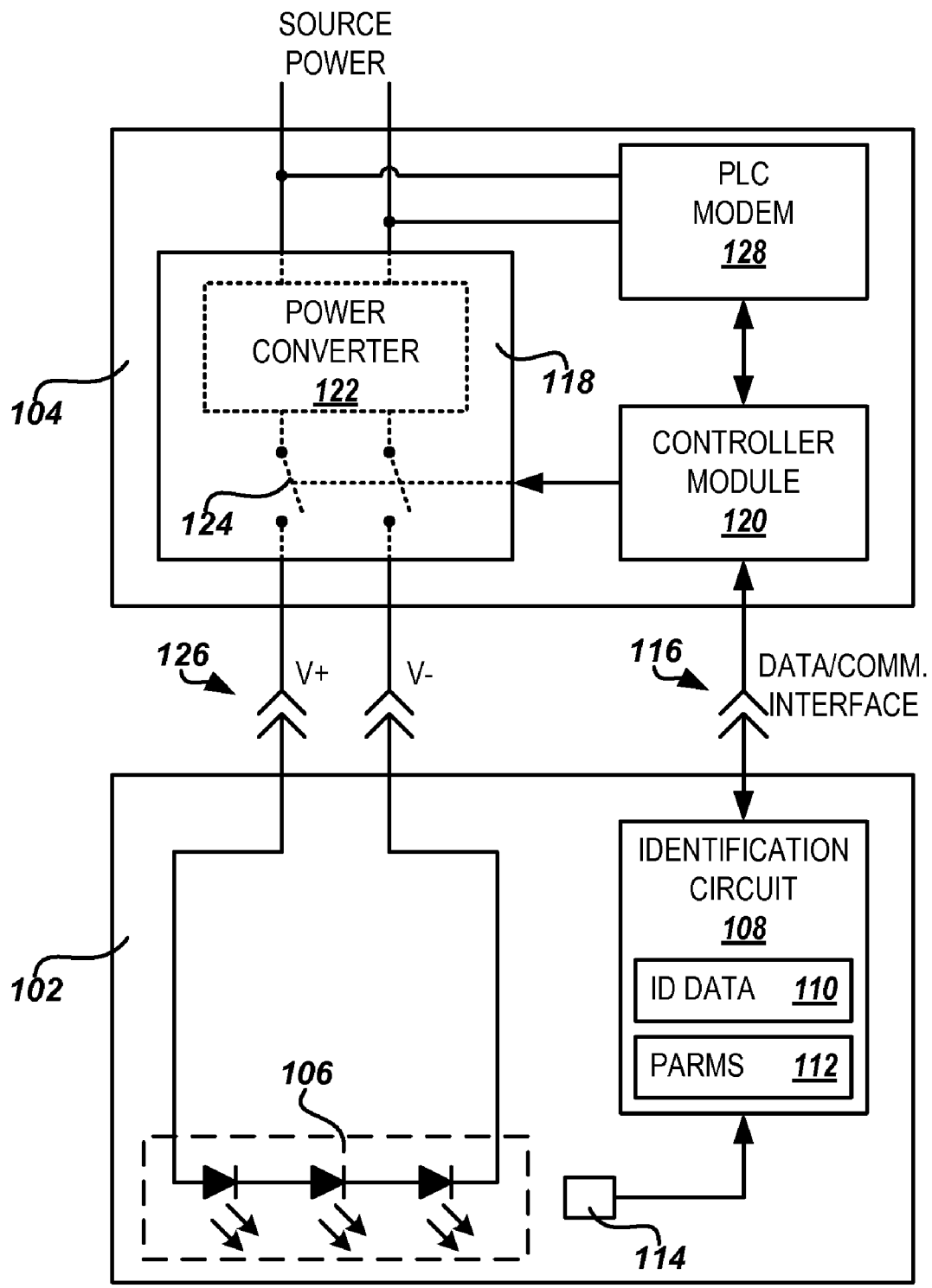
FIG. 1 is a block diagram showing aspects of an illumination device and a corresponding fixture device, according to the embodiments described herein.

FIG. 1 shows aspects of an illumination device 102 and a corresponding fixture device 104, according to the embodiments described herein. The illumination device 102 includes a luminary module 106 that emits light in response to the appropriate power being applied to the device. According to one embodiment, the luminary module 106 consists of a number of solid-state luminary ("SSL") devices. Examples of SSL devices may include, but are not limited to, high power light-emitting diodes ("LEDs"), organic light-emitting diodes ("OLEDs"), polymer light-emitting diodes ("PLEDs"), light-emitting transistors ("LETs"), and light-emitting capacitors ("LECs").

The SSL devices may be assembled in an array, or an arrangement of multiple SSL devices in various circuits. Examples of such circuits for arranging SSL devices include series, parallel, trees, buses, bussed arrays, grouped arrays, and various other topological arrangements of SSL devices. Different types and colors of SSL devices may be included in the array to produce the desired overall amount and color or temperature of light from the luminary module 106. According to further embodiments, the luminary module 106 may consist of one or more, incandescent lamps, fluorescent lamps, halogen lamps, high-intensity discharge ("HID") lamps, carbon nanotube-based structures, or any combination of these and other light-emitting devices.

The illumination device 102 further includes an identification circuit 108. According to one embodiment, the identification circuit 108 is an integrated circuit ("IC") device capable of storing identifying ("ID") data 110 which identifies the illumination device 102. The identification circuit 108 may be a single IC component or a combination of components. According to one embodiment, the identification circuit 108 includes a microcontroller IC chip, such as a BOARD ID chip from RENESAS TECHNOLOGY CORP. of Tokyo, Japan. In another embodiment, the identification circuit 108 includes a serial electrically-erasable programmable read-only memory ("EEPROM") chip.

The ID data 110 may include a stock keeping unit ("SKU") or a serial number that identifies the manufacturer of the illumination device 102 as well as the manufactured lot of devices to which the illumination device belongs. The ID data 110 may further include, but is not limited to, the type, color, temperature, and output of the luminary module 106 within the illumination device 102. The identification circuit 108 also includes a data/communication interface 116 that allows the ID data 110 to be retrieved, as will be described in detail below.

In a further embodiment, the identification circuit 108 may also store optimal driver parameters 112 for the luminary module 106 in addition to the ID data 110. The optimal driver parameters 112 may contain information essential to drive the luminary module 106 to optimal brightness, efficiency, and/or longest operational life. The optimal driver parameters 112 may include, but are not limited to, optimal current, modulation frequency, and voltage as well as acceptable heat and/or thermocouple values. These values may be based on the types of light-emitting devices contained in the luminary module 106 and may also depend upon characteristics of the manufacturing lot of the illumination device 102. As in the case of the ID data 110, the optimal driver parameters 112 may be retrieved from the identification circuit 108 over the data/communication interface 116, as will be described in detail below in regard to FIG. 4.

According to another embodiment, the identification circuit 108 may support optional sensors 114 located in the illumination device 102 to collect and store operational information regarding the device or the contained luminary module 106. For example, a thermocouple may be installed in the illumination device 102 in proximity to the luminary module 106, allowing the identification circuit 108 to collect and store temperature information regarding the luminary module. Other types of sensors 114 may be imagined by one skilled in the art, including, but not limited to, a light output sensor. The identification circuit 108 may interface with the sensors through any number of methods commonly known in the art. For example, the sensors may be connected to the general-purpose I/O ("GPIO") pins of a BOARD ID chip described above through an analog to digital converter ("ADC") circuit.

In addition, the identification circuit 108 may collect and store other operational information regarding the illumination device 102 and/or luminary module 106, such as hours of operation. This operational information may be stored in non-volatile storage of the identification circuit 108, such as flash random-access memory ("RAM"), so that the information remains with the illumination device 102 even when it is moved from one location or installation to another. This information may also be made available to external devices over the data/communication interface 116.

The corresponding fixture device 104 is also shown in detail in FIG. 1. According to embodiments, the fixture device 104 includes a driver module 118 that supplies operational power to the illumination device 102, specifically to the luminary module 106, and a controller module 120 that controls the operation of the driver module. The driver module 118 may be a single IC component or a combination of several components. For example, to drive a luminary module 106 comprising an array of SSL devices, the driver module may include a power converter component 122 to convert source power to the DC voltage necessary to drive the SSL array, as shown in FIG. 1. The power converter component 122 may comprise a transformer to drop the voltage to required levels, a rectifier circuit to convert the source power from AC to DC, and/or a filter circuit to control the supply of power to the SSL array.

The driver module 118 may further include a switching component 124 that allows the power to the illumination device 102 to be enabled and disabled by the controller module 120, as will be described in more detail below in regard to FIG. 4. The output of the driver module 118 is connected to the luminary module 106 in the illumination device 102 through one or more power connections 126, as further shown in the FIG. 1. The number of power connections 126 required may depend on the number and type of light-emitting devices in the luminary module 106 as well as the type of power supplied by the driver module 118.

It will be appreciated that the power converter component 122 and switching component 124 of the driver module 118 shown in FIG. 1 are provided as simplified examples for the purpose of this disclosure, and that the driver module may consist of any number of components required to allow the driver module to drive the luminary module 106 of the illumination device 102. For example, the driver module 118 may consist of a switching mode power supply circuit which can be controlled by the controller module 120 to supply the desired voltage and current to the luminary module 106. The controller module 120 may further be able to modify the output of the driver module 118 to brighten or dim the luminary module 106 or modify its color output by using modulation techniques, including, but not limited to, pulse-width modulation ("PWM"), pulse-shape modulation ("PSM"), bit angle modulation ("BAM"), pulse-code modulation ("PCM"), and parallel pulse-code modulation ("PPCM") techniques.

The controller module 120 in the fixture device 104 is responsible for communicating with the identification circuit 108 in the illumination device 102 to authenticate the illumination device for use with the fixture device, as will be described in detail below in regard to FIG. 4. The controller module 120 may also retrieve the optimal driver parameters 112 from the identification circuit 108 and modify the output of the driver module 118 to supply the desired power to the luminary module 106 according to these parameters. As discussed above, this may include the controller module 120 controlling the voltage, current, modulation frequency, and other aspects of the output of the driver module 118. This may also include the controller module 120 disabling the driver module 118 from providing any power to the illumination device 102 if the device is not authorized for use in the fixture device 104, as will be further described below in regard to FIG. 4.

The controller module 120 may be a single IC component or a combination of components. For example, the controller module 120 may include a microcontroller IC chip, containing non-volatile memory and on-board control logic. The controller module 120 communicates with the identification circuit 108 in the illumination device 102 via the data/communication interface 116. The data/communication interface 116 may be implemented using any number of hardware communication standards known in the art. Because of the nature of the detachable connectivity between the illumination device 102 and fixture device 104, a serial communication interface requiring a minimal number of connections may be desired, including, but not limited to I$^2$C, serial peripheral interface bus ("SPI"), RS-422, or other serial communication interface standard. For example, in an implementation utilizing a BOARD ID chip described above, the data/communication interface 116 may implement the I$^2$C standard and consist of three connections: a serial data ("SDA") connection, a serial clock ("SCL") connection, and a source voltage ("$V_{DD}$") connection for providing power to the identification circuit 108.

According to one embodiment, the controller module 120 may act as a network node on a power-line communication ("PLC") network as part of an overarching energy management system ("EMS"), such as that described in co-pending U.S. patent application Ser. No. 12/408,499 entitled "Energy Management System," filed on Mar. 20, 2009, which is expressly incorporated herein by reference in its entirety. The controller module 120 may be connected to a PLC modem 128 that allows the controller to communicate with other nodes on the PLC network, as well as with one or more central system controllers, as will be described in more detail below in regard to FIG. 2. The PLC modem 128 may be a separate IC component or combination of components, or it may be integrated into the controller module 120 circuitry or implemented in the controller module as software. The PLC modem 128 may be further connected to the source power for the fixture device 104 to facilitate a communication channel for the controller module 120 over the power lines.

It will be appreciated that, while the driver module 118, the controller module 120, and the PLC modem 128 are illustrated in FIG. 1 as being separate and distinct modules in the fixture device 104, any or all of these modules may be combined into a single integrated circuit or divided into further discrete circuits, as required. The implementation is a matter of choice dependent on the IC components utilized in the fixture device 104 and illumination device 102 as well as the form factor of these devices to be used. It will be further appreciated that any number of circuits may be conceived by one skilled in the art to perform the functions of these modules and other modules or components described herein, and it is intended that this application include all such circuits.

Figure 2:
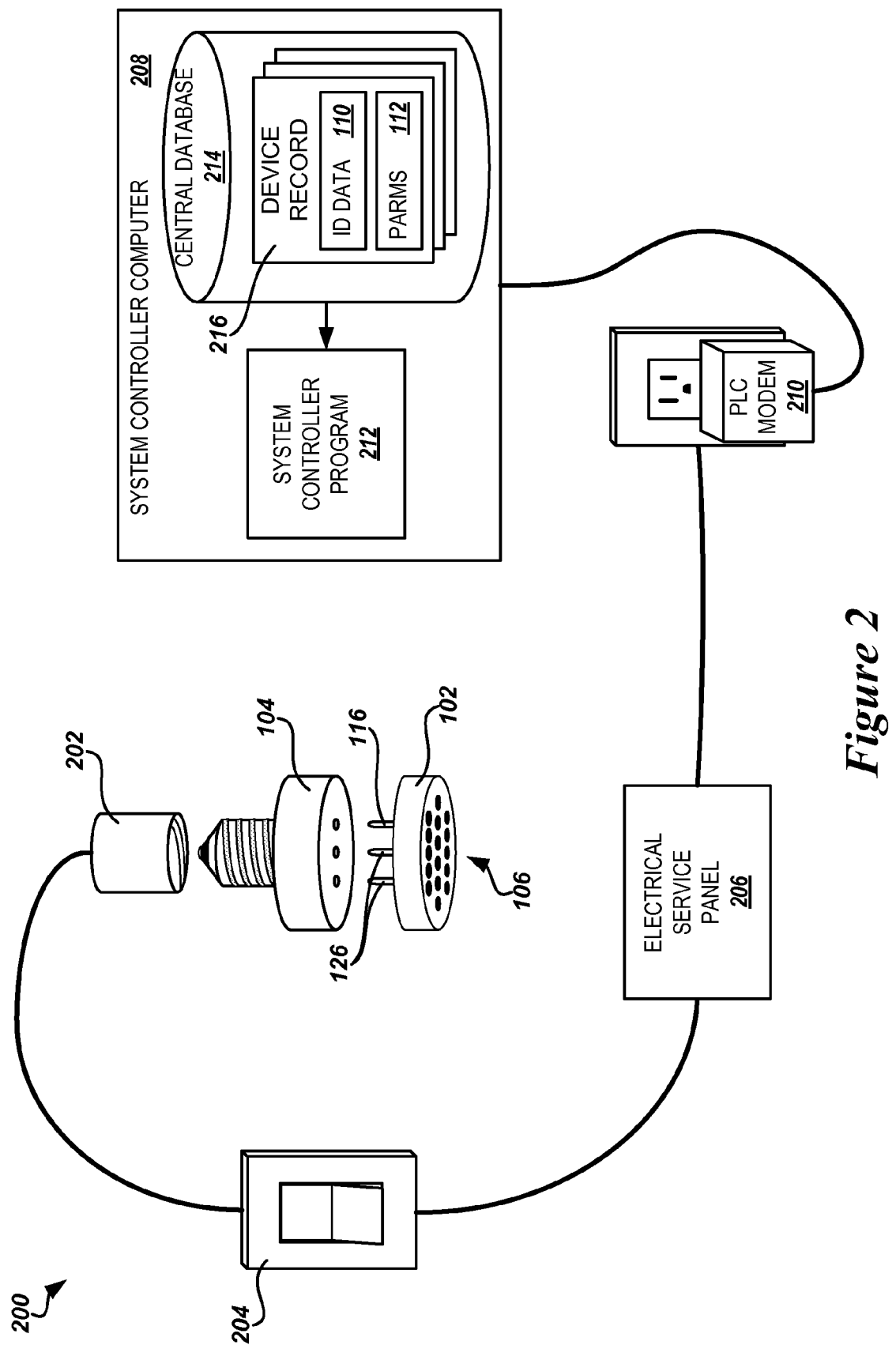
FIG. 2 is a block diagram showing an illustrative operating environment and various external components associated with the illumination and fixture devices, according to the embodiments described herein.

FIG. 2 shows one example of an operating environment 200 for the illumination device 102 and the corresponding fixture device 104. The illumination device 102 shown in FIG. 2 includes a luminary module 106 consisting of an array of SSL devices disposed from the lower surface and a number of connectors or "pins" on the upper surface for the power connections 126 and the data/communication interface 116 between the illumination device and the fixture device 104. As described above, the number of connectors required for the power connections 126 may depend on the number and type of light-emitting devices in the luminary module 106 and the type of power supplied by the driver module 118, while the number of connectors required for the data/communication interface 116 may depend on the serial communication interface standard implemented between the identification circuit 108 and the controller module 120.

The fixture device 104 has a corresponding number of connectors or "sockets" on its lower surface to receive the connectors of the illumination device 102 when the device is attached or connected to the fixture. The attachment between the illumination device 102 and the fixture device 104 is detachable to facilitate the replacement of illumination devices in the system. In other words, the illumination device 102 is capable of being detached from the fixture device 104 and replaced with a new illumination device, or the illumination device may be moved to another fixture device.

Figure 3A:
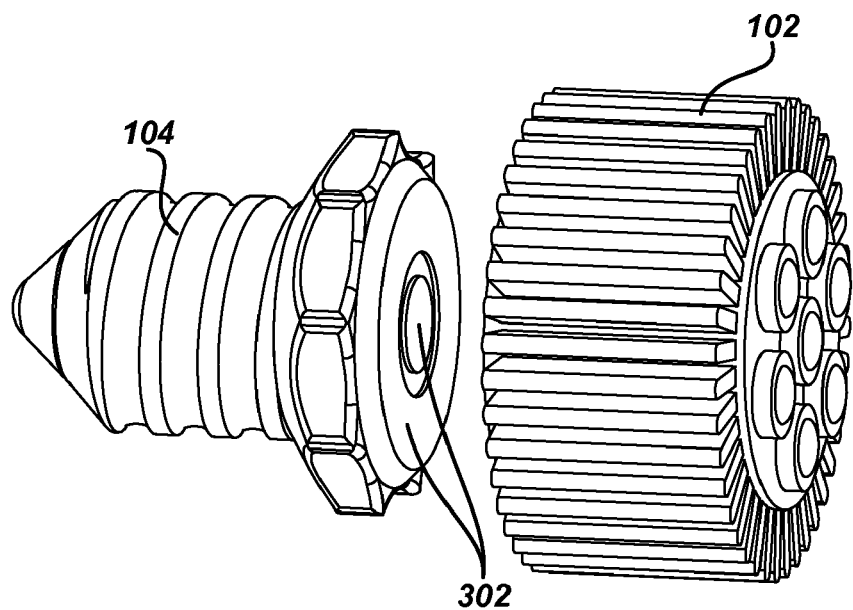
FIGS. 3A and 3B are perspective views of an illumination device configured to be coupled to a corresponding fixture device using magnetic couplings, according to one embodiment described herein.
Figure 3B:
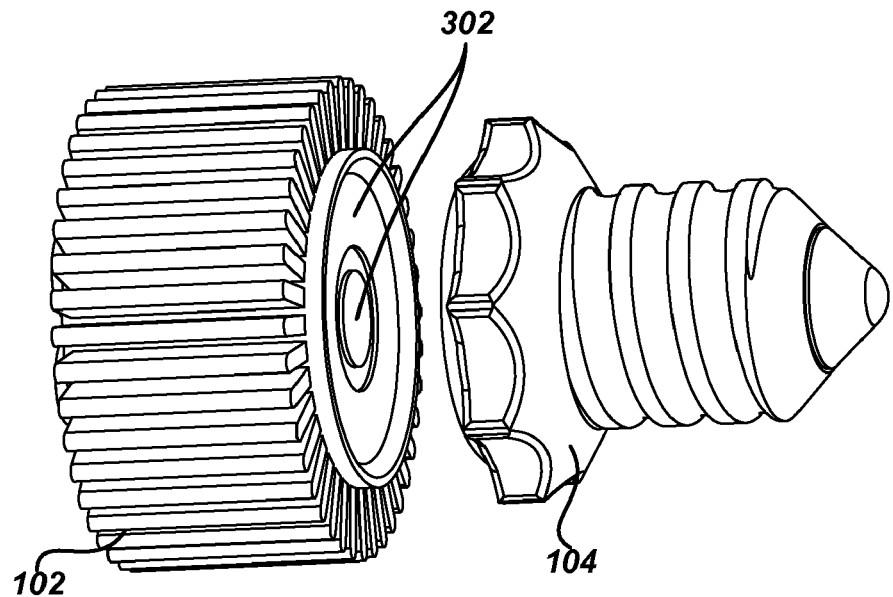

The mechanism for attachment of the illumination device 102 to the fixture device 104 may be any means known in the art beyond the pins and sockets shown in FIG. 2. According to one embodiment, the illumination device 102 attaches to the fixture device 104 using magnetic couplings 302, as illustrated in FIGS. 3A and 3B and described in co-pending U.S. patent application Ser. No. 12/408,464 entitled "A Conductive Magnetic Coupling System," filed on Mar. 20, 2009, which is expressly incorporated herein by reference in its entirety. The magnetic couplings 302 may serve both to mechanically attach the devices together as well as facilitate the power connections 126 and data/communication interface 116 connection. In further embodiments, additional attachment mechanisms may be utilized beyond those connectors described above and shown in the drawings. For example, the illumination device 102 may include thumb screws which allow the illumination device to be attached to the fixture device 104.

In one embodiment, the fixture device 104 is housed in an adaptor form factor configured to attach to the power source through a conventional light socket 202, such as the Edison-style screw socket shown in FIGS. 2, 3A, and 3B. This may be used when retrofitting a conventional lighting system with alternative lighting devices. The adaptor housing of the fixture device 104 may further be configured to fit other conventional lights sockets, such as the bi-pin socket used with traditional fluorescent tube lighting. In alternative embodiments, the fixture device 104 may connect directly to the power source through a simple, mechanical connection or through other proprietary means.

The power source to the fixture device 104 may be switched through a switch 204. The switch 204 may be a conventional light switch, or it may be a PLC switch that allows the controller module 120 in the fixture device 104 to communicate with other nodes on the PLC network even when the switch is in an "off" position. The power source for the fixture device 104 may be further connected to an electrical service panel 206 that also supplies power to other nodes on the PLC network, such as the system controller computer 208 shown in FIG. 2.

The system controller computer 208 may be general purpose computer such as a desktop, laptop, notebook, or server computer, or the system controller computer 208 may be special purposed computing device. The system controller computer 208 may execute a system controller program 212 which is responsible for managing one or more nodes on the PLC network, including the fixture device 104. The system controller computer 208 may be connected to a PLC modem 210 similar to that in the fixture device 104, creating a communication channel over the power lines between the controller module 120 in the fixture device and the system controller program 212 executing on the system controller computer.

As discussed briefly above, the controller module 120 of the fixture device 104 may be capable of controlling the voltage, current, modulation frequency, and other aspects of the output of the driver module 118 to the illumination device 102. The parameters used by the controller module 120 to control the output of the driver module 118 may be obtained from the identification circuit 108 in the illumination device 102, or they may be obtained from a central database 214. According to one embodiment, the central database 214 is located on or is replicated to the system controller computer 208. The central database 214 contains individual device records 216 that store the optimal driver parameters 112 for the corresponding ID data 110.

The device records 216 may be supplied by one or more manufacturers of compatible illumination devices and may be entered into the central database 214 by EMS administrative personnel, or retrieved from the manufacturer over the Internet by the system controller program 212 and stored in the central database. As will be discussed in more detail below in regard to FIG. 4, the controller module 120 in the fixture device 104 may access the central database 214 over the PLC network to retrieve the optimal driver parameters 112 for specific ID data 110, or the system controller program 212 may push the parameters to the fixture device through the PLC network.

According to another embodiment, the system controller program 212 may override the optimal driving parameters 112 used by the driver module 118 to supply power to the illumination device 102. The system controller program 212 may send driving parameters over the PLC network to the controller module 120 that are different from the optimal driving parameters 112 obtained from the identification circuit 108 or the central database 214. For example, the system controller program 212 may obtain the ID data 110 from the identification circuit 108 of the illumination device 102 over the PLC network, and then access the central database 214 to retrieve the optimal driver parameters 112 for the ID data 110. However, the system controller program 212 may modify the optimal driving parameters 112, based on knowledge of surrounding illumination devices in the environment, in order to make the light output of the illumination device 102 consistent in intensity and/or temperature (color) to the surrounding devices. The system controller program 212 will then send the modified driving parameters to the controller module 120 in the fixture device 104, and the controller module will use the modified parameters to control the output of the driver module 118 to the illumination device 102.

Figure 4:
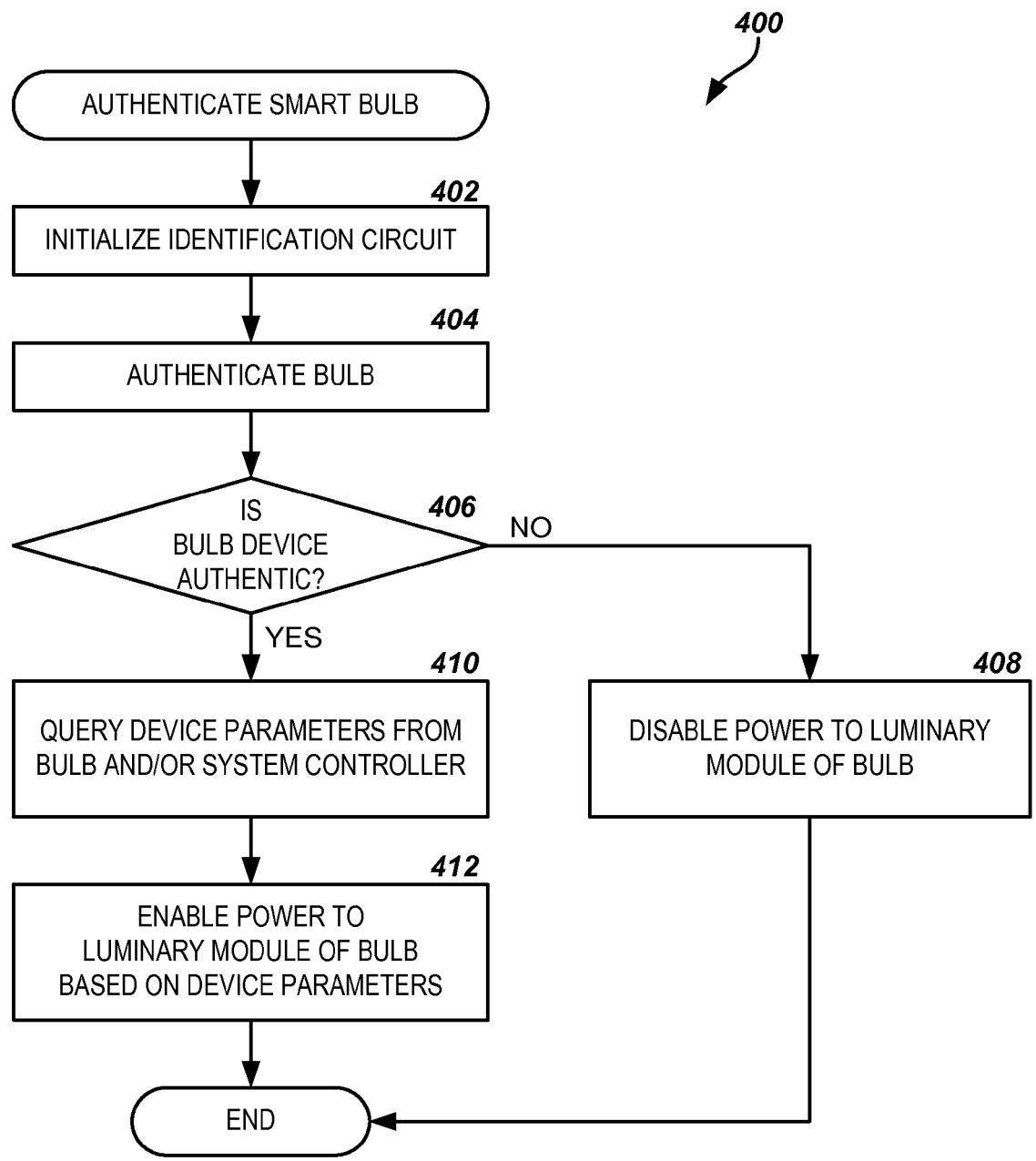
FIG. 4 is a flow diagram showing one method of authenticating an illumination device attached to a fixture device, according to the embodiments described herein.

Referring now to FIG. 4, additional details will be provided regarding the embodiments presented herein. It should be appreciated that the logical operations described with respect to FIG. 4 are implemented (1) as a sequence of computer implemented acts or program modules running on a microcontroller or computing system and/or (2) as interconnected machine logic circuits or circuit modules within the various components and modules described herein. The implementation is a matter of choice dependent on the components selected in the implementation of the illumination device 102 and the corresponding fixture device 104, as well as the performance and other requirements of the system. The logical operations described herein may be implemented in software or firmware of a computer system, in software or firmware within a microcontroller, in special purpose digital logic circuits, or any combination thereof. It should also be appreciated that more or fewer operations may be performed than shown in the figures and described herein. The operations may also be performed in a different order than described.

FIG. 4 illustrates a routine 400 for authenticating an illumination device 102 attached to a corresponding fixture device 104, according to one embodiment. The routine 400 may be executed by the controller module 120 of the fixture device 104 upon detecting the connection of an illumination device 102, or the routine may be executed each time the power source is applied to the fixture device. The routine 400 begins at operation 402, where the controller module 120 initializes the identification circuit 108 on the illumination device 102. This may involve simply providing source power ($V_{DD}$) to the identification circuit 108, or it may involve a more complex initialization sequence wherein the controller module 120 negotiates communications standards and other initialization parameters with the identification circuit.

From operation 402, the routine 400 proceeds to operation 404, where the controller module 120 authenticates the attached illumination device 102. According to one embodiment, the authentication process involves the controller module 120 retrieving the serial number or SKU stored as part of the ID data 110 in the identification circuit 108 and checking it against a stored list of authorized SKUs. The controller module 120 uses the data/communication interface 116 between the module and the identification circuit 108 to read the ID data 110 stored therein. The list of authorized SKUs may be present in the controller module 120, or the controller module 120 may utilize the PLC network to access a list of authorized SKUs on a remote device, such as the system controller computer 208.

In another embodiment, the controller module 120 authenticates the illumination device 102 using an asymmetrical encryption scheme such as a public key infrastructure ("PKI"). This authentication scheme may provide a more robust and secure form of authentication between the illumination device 102 and the fixture device 104, as well as provide a mechanism for licensing manufactures of compatible illumination devices by providing each licensed manufacture with a security certificate containing a public key and a corresponding private key that are stored in the identification circuit 108 of the device.

For example, the controller module 120 may request authentication from the identification circuit 108 over the data/communication interface 116. In response, the identification circuit 108 may return the security certificate issued to the manufacturer and stored within the circuit. The controller module 120 validates the security certificate against a certificate of authority contained in the controller module. The controller module 120 then sends a challenge, such as a random number, to the identification circuit 108 to prove that the identification circuit contains the private key associated with the certificate. The identification circuit 108 digitally signs the random number with its private key, and returns it as a response to the controller module 120. If the controller module 120 validates the challenge response using the public key stored in the security certificate previously provided by the identification circuit 108, then the illumination device 102 is authenticated for use with the fixture device 104. It will be appreciated that other forms of authentication may be used to authenticate the illumination device 102 beyond those described above, including, but not limited to, a symmetrical exchange of private keys or other encryption techniques.

If, at operation 406, the illumination device 102 is not authentic, i.e. the controller module 120 fails to authenticate the identification circuit 108 in the device, then the routine 400 proceeds to operation 408, where the controller module disables all power output from the driver module 118 to the luminary module 106 in the illumination device. Alternatively, the controller module 120 may take more proactive countermeasures against the unauthorized illumination device 102, such as causing the driver module 118 to send a voltage spike to the illumination device, thus permanently disabling it. From operation 408, the routine 400 ends.

If, however, the illumination device 102 is found to be authentic, the routine 400 proceeds from operation 406 to operation 410, where the controller module 120 retrieves the remaining ID data 110 and the optimal driver parameters 112, if present, from the identification circuit 108 of the device. In one embodiment, the controller module 120 accesses the central database 214 stored on the system controller computer 208 over the PLC network to locate the device record 216 for the ID data 110 retrieved from the identification circuit 108 and retrieve the optimal driver parameters for the illumination device 102. The controller module 120 may access this remote set of optimal driver parameters 112 even if a set of optimal driver parameters is stored in the identification circuit 108, because manufacturers may periodically update driver parameters for their illumination devices based on testing or changes in the light output of the devices over time.

From operation 410, the routine proceeds to operation 412, where the controller module 120 causes the driver module 118 to supply the appropriate power output to the luminary module 106 on the illumination device 102 based on the optimal driver parameters 112 retrieved from the identification circuit 108 and/or the central database 214. This may include modifying the voltage, current, and modulation frequency of the output of the driver module 118 to match the specified parameters. From operation 412, the routine 400 ends.

Figure 5:
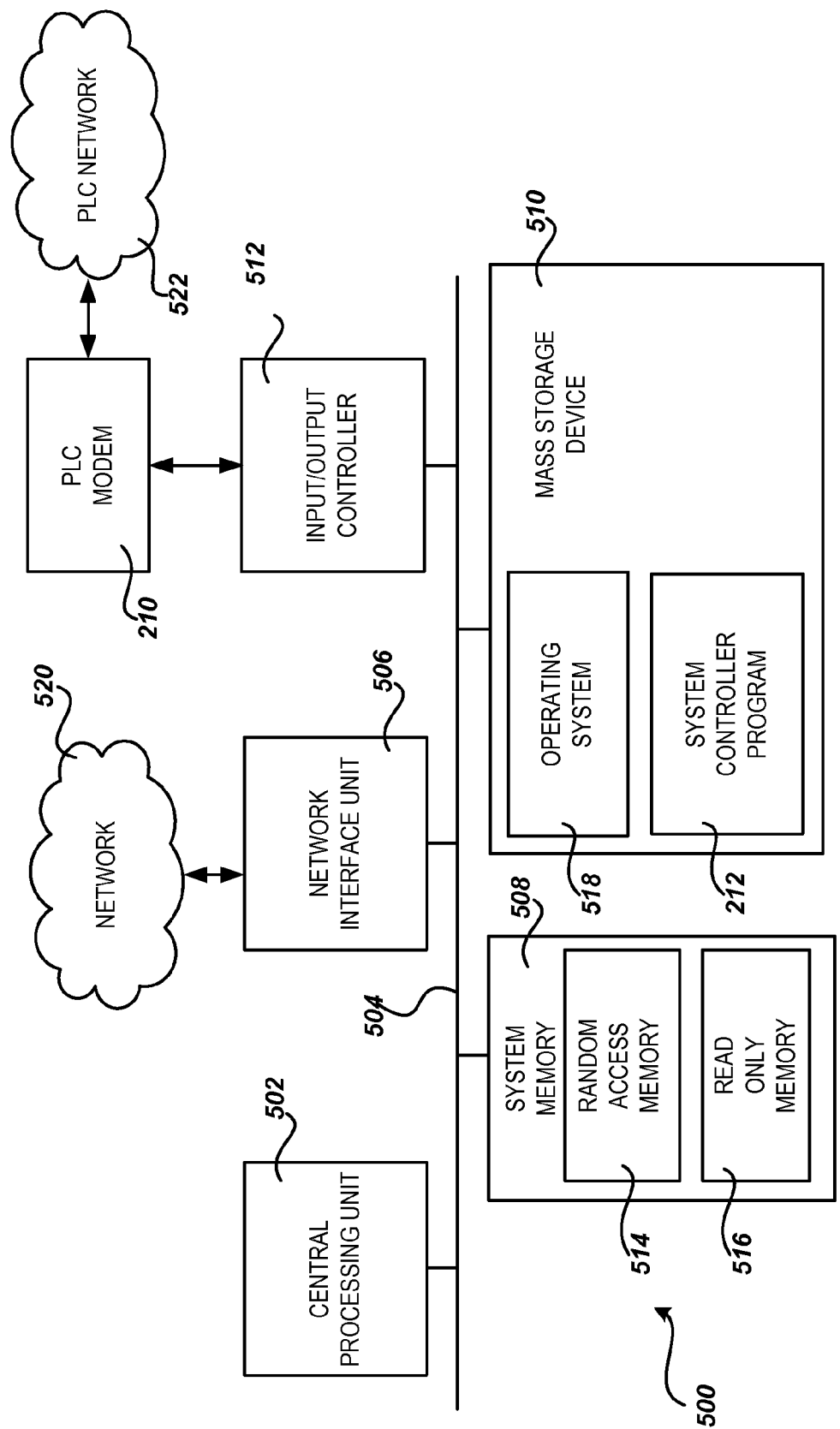
FIG. 5 is a block diagram showing an illustrative computer hardware and software architecture for a computing system capable of implementing aspects of the embodiments presented herein.

FIG. 5 shows example computer architectures for a computer 500 capable of managing one or more nodes on the PLC network 522, including the fixture device 104, in the manner presented above. The computer architecture shown in FIG. 5 illustrates a conventional computing device, PDA, digital cellular phone, communication device, desktop computer, laptop, or server computer and may be utilized to execute any aspects of the software components presented herein described as executing on the system controller computer 208 or other computing platform.

The computer architecture shown in FIG. 5 includes a central processing unit 502 (CPU), a system memory 508, including a random access memory 514 (RAM) and a read-only memory 516 (ROM), and a system bus 504 that couples the memory to the CPU 502. A basic input/output system containing the basic routines that help to transfer information between elements within the computer 500, such as during startup, is stored in the ROM 516. The computer 500 also includes a mass storage device 510 for storing an operating system 518, application programs, and other program modules, which are described in greater detail herein.

The mass storage device 510 is connected to the CPU 502 through a mass storage controller (not shown) connected to the bus 504. The mass storage device 510 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable media can be any available computer storage media that can be accessed by the computer 500.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium that can be used to store the desired information and that can be accessed by the computer 500.

According to various embodiments, the computer 500 may operate in a networked environment using logical connections to remote computing devices and computer systems through a network 520. The computer 500 may connect to the network 520 through a network interface unit 506 connected to the bus 504. It should be appreciated that the network interface unit 506 may also be utilized to connect to other types of networks and remote computer systems. The computer 500 may also include an input/output controller 512 for receiving and processing input from a number of input and output devices. For example, the input/output controller 512 may support the connection of the computer 500 to the PLC modem 210, which allows application programs executing on the computer to communicate with other nodes on the PLC network 522, such as the fixture device 104 described above in regard to FIGS. 1 and 2. The input/output controller 512 may also be connected to other input devices, including a keyboard, a mouse, a touchpad, a touch screen, an electronic stylus, or other type of input device. Similarly, the input/output controller 512 may provide output to a display device, such as a computer monitor, a flat-panel display, a digital projector, a printer, a plotter, or other type of output device.

As mentioned briefly above, a number of program modules and data files may be stored in the mass storage device 510 and RAM 514 of the computer 500, including an operating system 518 suitable for controlling the operation of a computer. The mass storage device 510 and RAM 514 may also store one or more program modules. In particular, the mass storage device 510 and the RAM 514 may store the system controller program 212, which was described above in regard to FIG. 2. The mass storage device 510 and the RAM 514 may also store other types of program modules or data, such as the central database 214.

Based on the foregoing, it should be appreciated that technologies for an illumination device and a corresponding fixture device are provided herein. The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A lighting system, comprising:
   an illumination device comprising a luminary module and an identification circuit; and
   a fixture device comprising a driver module and a controller module, wherein the illumination device is detachably connected to the fixture device, the driver module is configured to supply power to the luminary module, and the controller module is configured to
      communicate with the identification circuit of the illumination device to determine if the illumination device is authentic,
      upon determining that the illumination device is authentic, communicate with the identification circuit to retrieve data and cause the driver module to supply power to the luminary module of the illumination device according to the data, and
      upon determining that the illumination device is not authentic, cause the driver module to remove power from the luminary module of the illumination device.

2. The system of claim 1, wherein the controller module is further configured to, upon determining that the illumination device is not authentic, permanently disable the luminary module of the illumination device.

3. The system of claim 1, wherein determining if the illumination device is authentic comprises reading identifying data from the identification circuit and validating the identifying data.

4. The system of claim 1, wherein determining if the illumination device is authentic comprises negotiating authentication with the identification circuit using an asymmetrical encryption scheme.

5. The system of claim 1, wherein the identification circuit of the illumination device is configured to collect and store usage information regarding the luminary module, and wherein the controller module of the fixture device is further configured to read the usage information from the identification circuit.

6. The system of claim 5, wherein the usage information comprises hours of operation of the luminary module.

7. The system of claim 1, wherein the identification circuit comprises an integrated circuit device.

8. The system of claim 1, wherein the luminary module comprises an array of solid-state luminary ("SSL") devices.

9. The system of claim 1, wherein communicating with the identification circuit comprises accessing a data/communication interface of the identification circuit to retrieve data.

10. The system of claim 1, wherein the driver module and the controller module are implemented in a same IC component.

11. A lighting system, comprising:
    an illumination device comprising a luminary module and an identification circuit containing identifying data; and
    a fixture device comprising a driver module and a controller module, wherein the illumination device is detachably connected to the fixture device, the driver module is configured to supply power to the luminary module, and the controller module is configured to
       read the identifying data from the identification circuit,
       retrieve optimal driver parameters regarding the luminary module associated with the identifying data from a central database, and
       cause the driver module to supply power to the luminary module of the illumination device according to the optimal driver parameters.

12. The system of claim 11, wherein the optimal driver parameters comprise one or more of a current value, a modulation frequency value, a voltage value, and a heat/thermocouple value.

13. The system of claim 11, wherein the identification circuit comprises an integrated circuit device.

14. The system of claim 11, wherein the driver module and the controller module are implemented in a same IC component.

15. A lighting system, comprising:
    an illumination device comprising a luminary module and an identification circuit containing optimal driver parameters regarding the luminary module; and
    a fixture device comprising a driver module and a controller module, wherein the illumination device is detachably connected to the fixture device, the driver module is configured to supply power to the luminary module, and the controller module is configured to
       read the optimal driver parameters from the identification circuit, and
       cause the driver module to supply power to the luminary module of the illumination device according to the optimal driver parameters.

16. The system of claim 15, wherein the optimal driver parameters comprise one or more of a current value, a modulation frequency value, a voltage value, and a heat/thermocouple value.

17. The system of claim 15, wherein the identification circuit comprises an integrated circuit device.

18. The system of claim 15, wherein the driver module and the controller module are implemented in a same IC component.

* * * * *